Aug. 4, 1931. A. S. CLAY 1,817,350
ORIENTATOR OR ARCHITECT'S SOLAR DIAL
Filed Sept. 29, 1930 4 Sheets-Sheet 1
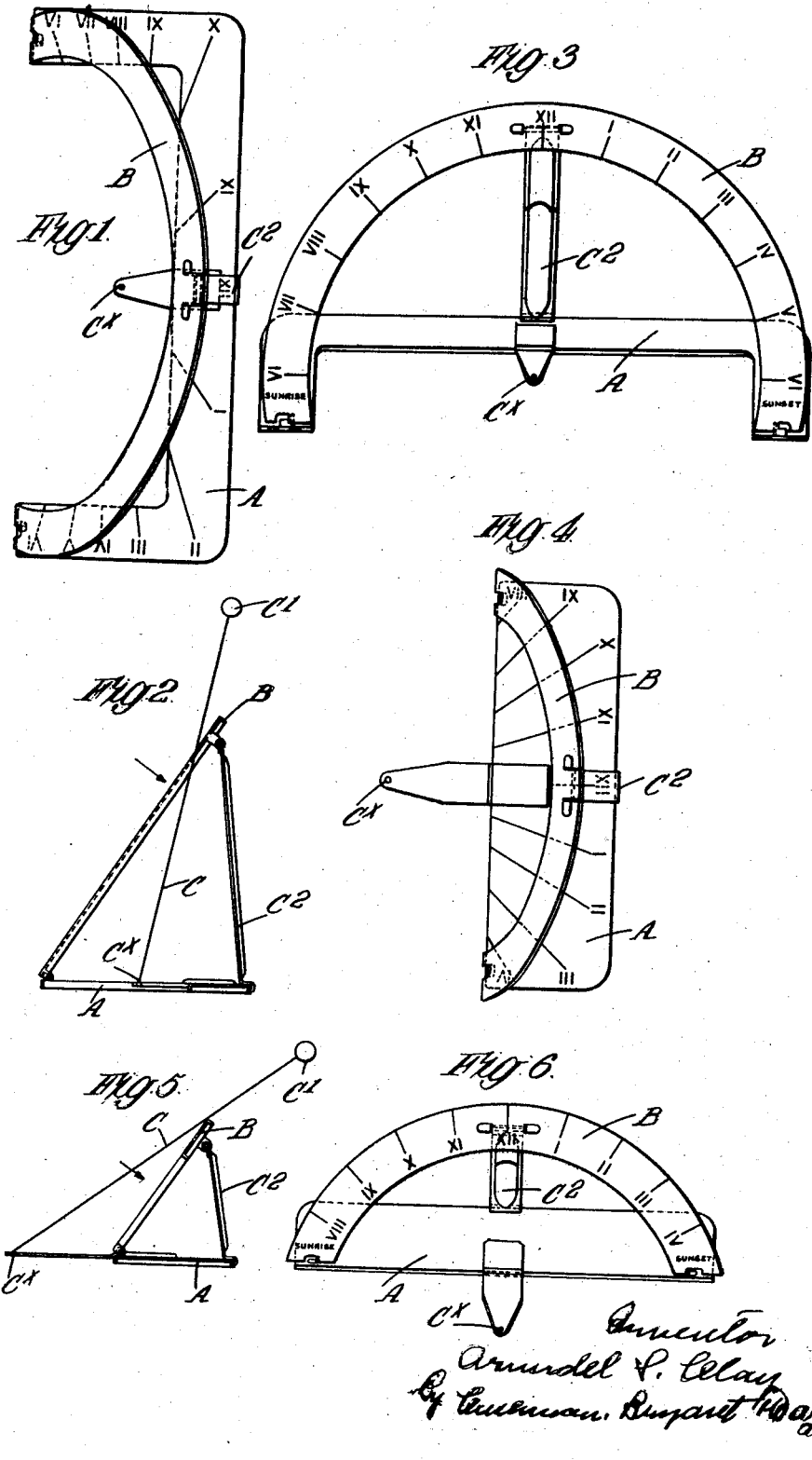

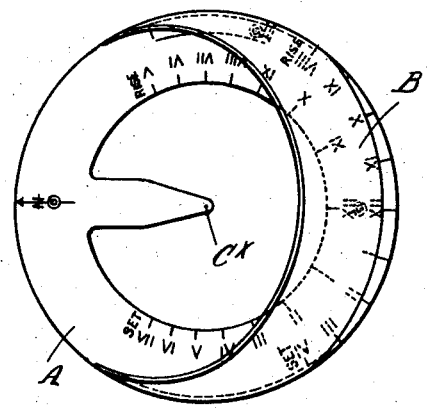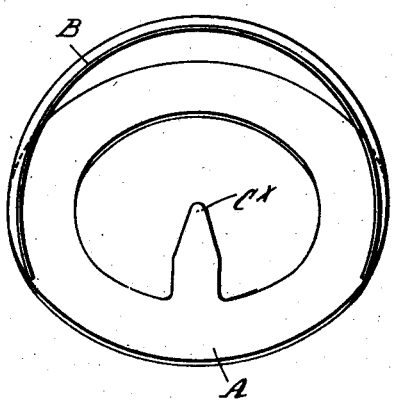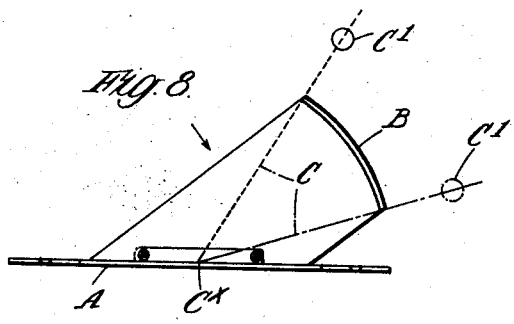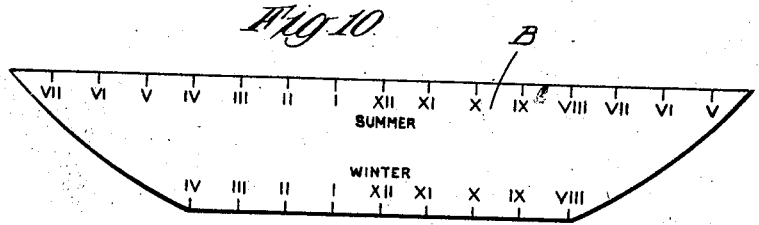

Aug. 4, 1931. A. S. CLAY 1,817,350
ORIENTATOR OR ARCHITECT'S SOLAR DIAL
Filed Sept. 29, 1930 4 Sheets-Sheet 3
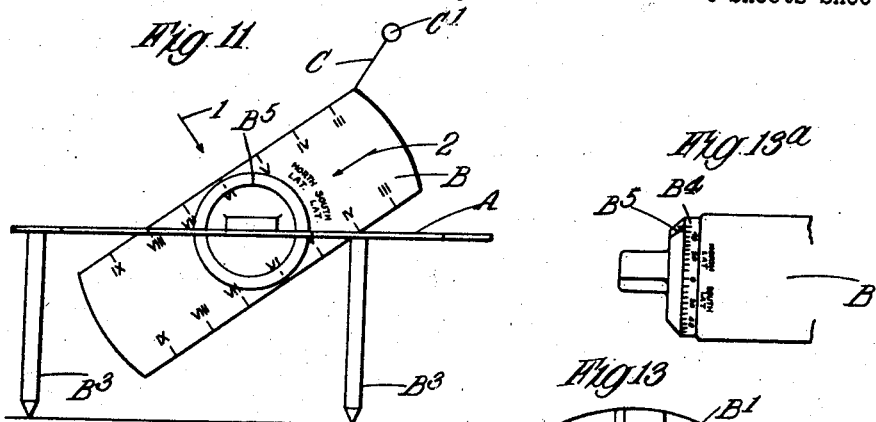
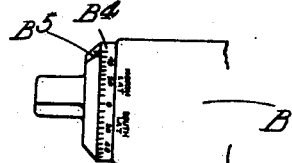
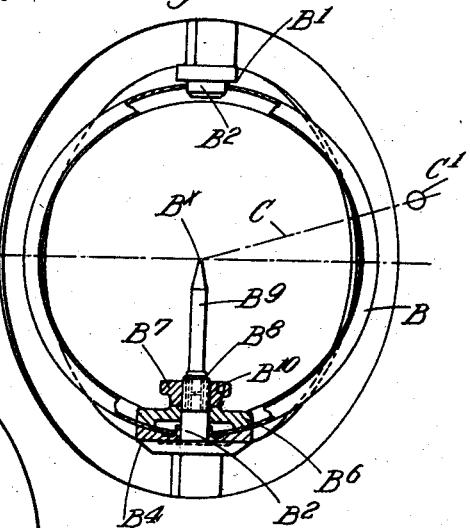
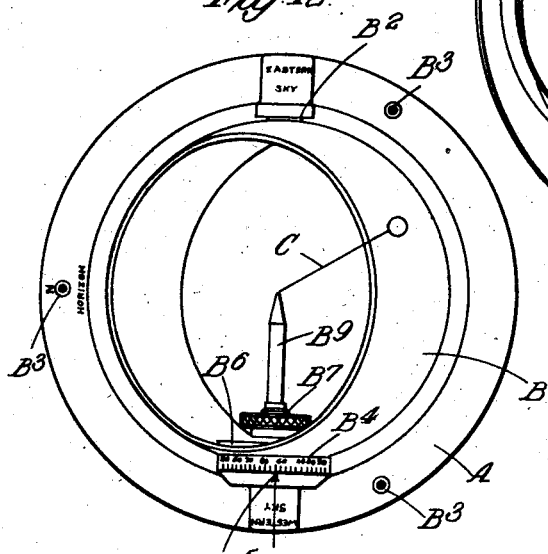
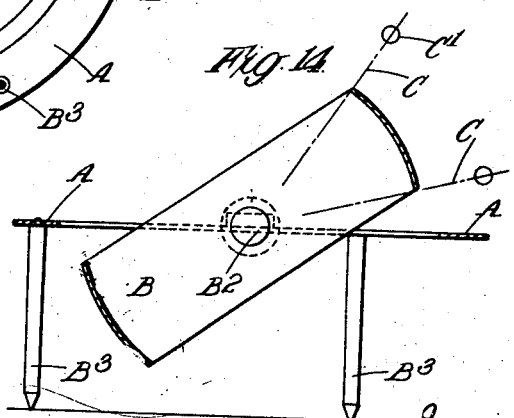

Aug. 4, 1931.　　　　A. S. CLAY　　　　1,817,350
ORIENTATOR OR ARCHITECT'S SOLAR DIAL
Filed Sept. 29, 1930　　4 Sheets-Sheet 4
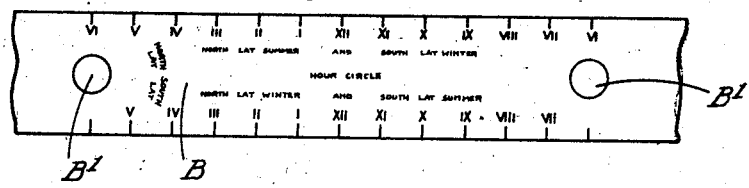
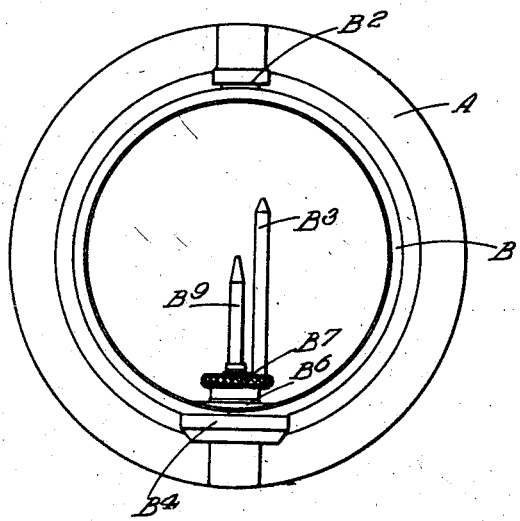
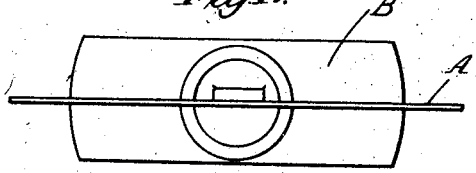

Patented Aug. 4, 1931

1,817,350

UNITED STATES PATENT OFFICE

ARUNDEL SPENCER CLAY, OF LONDON, ENGLAND, ASSIGNOR TO COOKE, TROUGHTON & SIMMS LIMITED, OF YORK, ENGLAND, A BRITISH COMPANY

ORIENTATOR OR ARCHITECT'S SOLAR DIAL

Application filed September 29, 1930, Serial No. 485,269, and in Great Britain September 3, 1929.

This invention relates to what we term an orientator or architect's solar dial, i. e. an instrument for ascertaining from architectural plans the direction of the rays of the sun at different times of the day in relation to selected parts of buildings set out on the plans.

According to the invention the said instrument comprises a base plate or member representing the horizon and a tilted member which represents the plane of the path of the sun and which is engraved in hours to represent the position of the sun at different times during the day, the hour graduations being so spaced as to represent the sun's progress at a rate of approximately 15° of arc for each hour. The base plate has pivotally connected thereto a member which may conveniently be in the form of a cord and which may have at its outer end a brass ball representing the sun. The said pivoted member extends upwardly beyond the tilted member (which is herein referred to as the hour circle) and the pivotal point between it and the base plate represents the observer's position so that by placing the instrument on an architectural plan in such a manner that the said point corresponds to the position of the building on the plan to be studied and arranging the instrument so that a line joining the points of sunrise and sunset on the hour circle or on the base plate is due East and West with reference to the North point on the plan, the pivoted member can be swung into different positions with respect to the hour circle and it can then be seen what is the direction of the sun's rays at any time of the day in relation to the particular position selected on the plan.

The sun's declination varies from month to month during each year, but as it may not be desirable to vary the position of the pivotal point of the aforesaid movable member, we may provide two instruments one representing the average conditions prevailing during the summer months and the other representing the average conditions prevailing during the winter months. These will give a close approximation to the conditions obtaining during nearly four months of summer and during nearly four months of winter.

In an alternative construction a single instrument can be used for both summer and winter and in this case its tilted member has two sets of hour graduations one set representing the average conditions prevailing during the summer months and the other set representing the average conditions prevailing during the winter months. This tilted member can also be made adjustable to agree with different latitudes.

In order that the said invention may be clearly understood and readily carried into effect, the same will now be described more fully with reference to the accompanying drawings in which:—

Figure 1 is a plan of one form of instrument representing the average conditions prevailing during the summer months, Figure 2 is a sectional side elevation of Figure 1, Figure 3 is a view of the instrument looking in the direction of the arrow in Figure 2, Figures 4, 5 and 6 are views similar to Figures 1, 2 and 3 showing the instrument representing the average conditions prevailing during the winter months, Figures 7, 8 and 9 are also views similar to Figures 1, 2 and 3 showing a form of the instrument representing the average conditions prevailing during both the summer and winter months, Figure 10 is a development of the graduated tilted member or hour circle of Figures 7, 8 and 9, Figure 11 is a side elevation showing an instrument similar to that of Figures 7 to 10 but made adjustable for different latitudes both North and South of the Equator, Figure 12 is a plan of Figure 11, Figure 13 is a view of Figure 11 looking in the direction of the arrow 1, with parts in section, Figure 13a is a local view looking in the direction of the arrow 2 of Figure 11, Figure 14 is a vertical section of Figure 11, Figure 15 is a development of part of the hour circle of Figures 11 to 14, Figure 16 is a plan showing the parts of the instrument of Figures 11 to 14 arranged for transport, and Figure 17 is a side elevation of Figure 16.

In the various figures, A is the base plate which represents the observer's horizon, B is the tilted member or hour circle and C is the pivoted member which is in the form of a cord provided at its outer end with a ball $C^1$ representing the sun.

Referring to Figures 1 to 6, the base plate A supports the hour circle B at an angle depending upon the latitude for which the instruments are designed. In the examples shown the instruments are for use in latitude 33° and the hour circles are arranged at an angle of 57° to the base plate.

The instrument which represents the conditions obtaining during the summer months (Figures 1 to 3) has the pivotal point $C^x$ of the cord C arranged at such a position that the said cord makes an angle of 77°—30′ to the base plate at noon thus giving a north declination of 20°—30′ between the said member and the plane of the hour circle. The instrument which represents the conditions obtaining during the winter months (Figures 4 to 6) has the pivotal point $C^x$ of the cord C arranged at such a position that the said member makes an angle of 36°—30′ to the base plate thus giving a south declination of 20°—30′ between it and the plane of the hour circle. For an instrument designed for use in latitude 54° (which is that of York, England) the hour circle is arranged at an angle of 36° to the base plate and the aforesaid cord makes an angle of 56°—30′ to the base plate at noon in such an instrument representing the conditions obtaining during the summer months, the corresponding angle for an instrument representing the conditions obtaining during the winter months being 15°—30′.

It will, of course, be understood that midday in ordinary time and 1 o'clock in summer time is the culminating point of the hour circle and that this circle would be figured from left to right when used in the Northern hemisphere and from right to left when used in the Southern hemisphere. The base plate may also be graduated as shown to represent the direction of the rays at each hour on the hour circle projected vertically down on to the horizontal plane. These graduations are not essential but are convenient as they give the horizontal direction directly.

In using the selected instrument it is placed on the architectural plan with the point $C^x$ on the portion of the building to be studied and arranged so that a line joining the points of sunrise and sunset marked on the hour circle is due East and West with reference to the North point on the plan. The cord is then swung into different positions over the hour circle and the incidence of the sun's rays at any time of the day in relation to the selected point on the plan can thus be ascertained.

In each of the instruments according to Figures 1 to 6 the hour circle is pivotally connected to the base plate and supported at the rear by a pivoted arm $C^2$ which at its lower end has a clip portion engaging with the rear part of the base plate. The instrument can thus be folded into a flat condition when not in use.

In Figures 7 to 10, which represent an instrument designed to represent both summer and winter conditions, the hour circle B forms part of a sphere and its upper surface (the edge of which is provided with hour graduations) is in such a position as to give the cord C the required angle for summer conditions whilst its lower surface (the edge of which is provided with hour graduations) gives the said cord the required angle for winter conditions. The said hour circle is disposed at an angle to the base plate depending upon the latitude in which the instrument is to be used. In the example shown the various angles are those mentioned above as pertaining to the latitude of York, England, and the instrument is used in the manner above described.

In the construction according to Figures 11 to 16 the hour circle B, instead of being arranged at a fixed angle to the horizontal as in the constructions hereinbefore described, is made adjustable to suit different latitudes. For this purpose the said hour circle (which is in the form of a complete circle representing a twenty-four hour day) is formed with oppositely arranged holes $B^1$, $B^1$ which receive pivot pins $B^2$, $B^2$ carried by a ring A constituting the base member that represents the horizon, the said ring being supported by pillars $B^3$, $B^3$, $B^3$. The portion of the hour circle adjacent to one of the pivot pins $B^2$ is secured to a collar $B^4$ the periphery of which is graduated to represent North and South latitudes, these graduations being read against a fixed index $B^5$. Bearing against the inner surface of the hour circle is a collar $B^6$ which is held firmly in position by a clamping nut $B^7$ which engages with a screw threaded extension $B^8$ (Figure 13) of the pivot pin $B^2$. This extension is formed with a screw threaded axial hole to receive a pin $B^9$ the point of which is located at the centre of the aforesaid ring $B^x$. The aforesaid cord C is attached to the point of the said pin and is connected to the ball $C^1$ representing the sun as hereinbefore described, the point of the pin representing the observer's position on the architectural plan as previously explained. The hour circle B forms part of a sphere and has its edge portions graduated to represent a twenty-four hour day. The graduations which are uppermost in Figure 11 are for summer in the Northern hemisphere and for winter in the Southern hemisphere, whilst the graduations that are lowermost in Figure 11 are for winter in the Northern hemisphere and summer in the Southern hemisphere. When the cord C bears against the upper edge of the hour circle with the latter adjusted as shown in Figures 11 to 14 to a latitude of North 54°, the conditions are similar to those obtaining when the cord is similarly placed on the instrument according to Figures 7 to 9, that is to say the ball $C^1$ represents the summer sun for that particular latitude. Similarly when the cord is disposed in contact with the lower edge of the hour circle as shown by chain lines in Figure 14, the ball $C^1$ represents the winter sun at that particular latitude.

For transporting purposes the aforesaid pillars $B^3$, which are screwed into the ring A, are removed and screwed into three screw threaded holes provided in the aforesaid clamping nut $B^7$, one of these holes being indicated at $B^{10}$ in Figure 13. The instrument is then in compact condition shown by Figures 16 and 17.

What I claim and desire to secure by Letters Patent of the United States is:—

1. An orientator or architect's solar dial comprising a base plate representing a horizon, a second member, representing the plane of the path of the sun, extending upward from and at an inclination to the base plate and which is provided with hour graduations to represent the position of the sun at different times during the day, and a third member pivotally connected to the base plate and movable over the said inclined member, the pivotal point of said third member representing the observer's position on an architectural plan upon which the instrument is placed when in use for the purposes specified.

2. An orientator or architect's solar dial as in claim 1, wherein the pivoted member is in the form of a cord carrying a ball to represent the sun.

3. An orientator or architect's solar dial as in claim 1, wherein the pivotal point of the pivoted member is fixed in such a position as to give the average conditions prevailing during the summer months.

4. An orientator or architect's solar dial as in claim 1, wherein the pivotal point of the pivoted member is fixed in such a position as to give the average conditions prevailing during the winter months.

5. An orientator or architect's solar dial as in claim 1, wherein the inclined member is provided with two sets of hour graduations one representing the average conditions prevailing during the summer months and the other representing the average conditions prevailing during the winter months.

6. An orientator or architect's solar dial as in claim 1, wherein the inclined member is in the form of part of a sphere and is so arranged that its upper surface occupies such a position as to give the pivoted member the required angle for summer conditions whilst its lower surface occupies such a position as to give the said member the required angle for winter conditions.

7. An orientator or architect's solar dial as in claim 1, wherein the inclined member is made adjustable to suit different latitudes.

8. An orientator or architect's solar dial as in claim 1, wherein the inclined member is in the form of a complete circle representing a twenty-four hour day to suit the variable times of sunrise and sunset at different latitudes.

ARUNDEL SPENCER CLAY.